United States Patent [19]

Tsukui

[11] 4,219,297
[45] Aug. 26, 1980

[54] APPARATUS WITH ROTARY INCLINED STORAGE CELLS

[75] Inventor: Kunitsugu Tsukui, Chigasaki, Japan

[73] Assignee: Hitachi, Ltd., Japan

[21] Appl. No.: 951,886

[22] Filed: Oct. 16, 1978

[30] Foreign Application Priority Data

Oct. 19, 1977 [JP] Japan ................................ 52-124497

[51] Int. Cl.² .......................... B65G 1/00; E04H 6/06
[52] U.S. Cl. ..................................... 414/276; 221/89; 414/266; 414/285
[58] Field of Search ............... 417/787, 276, 266, 285; 221/89, 4

[56] References Cited

U.S. PATENT DOCUMENTS

| | | | |
|---|---|---|---|
| 646,860 | 4/1900 | Moyes | 221/4 |
| 2,616,776 | 11/1952 | Jones | 221/89 |
| 3,143,207 | 8/1964 | Wagner | 221/89 |
| 3,209,940 | 10/1965 | Gushwa et al. | 221/4 |
| 3,651,984 | 3/1972 | Redenbach | 221/4 |
| 3,854,605 | 12/1974 | Pioper et al. | 414/283 |
| 4,069,942 | 1/1978 | Marshall et al. | 221/4 |
| 4,146,150 | 3/1979 | Low et al. | 414/276 X |

Primary Examiner—Stephen G. Kunin
Assistant Examiner—R. B. Johnson
Attorney, Agent, or Firm—Craig & Antonelli

[57] ABSTRACT

A storage apparatus for cartridges used with a system for recording, storing and reproducing information comprises a cylindrical member with a plurality of inclined cells. A disk-like shield plate formed with an opening is arranged adjacent to one side of the cells. A motor which is controlled by a decoder and encoder rotates the member and the shield plate. When a particular cartridge is to be removed from a cell, the member and the shield plate are rotated to bring one of the inclined cells and the opening in the shield plate into alignment with each other at an uppermost position. The cartridge is discharged from the cell by gravity. When it is desired to store cartridges in the cells, the member and the shield plate are rotated to bring one of the inclined cells and the opening in the shield plate into alignment with each other at a lowermost position where a cartridge is moved by gravity into a cell.

3 Claims, 4 Drawing Figures

APPARATUS WITH ROTARY INCLINED STORAGE CELLS

BACKGROUND OF THE INVENTION

The present invention relates to an article storage apparatus and more particularly to a storage apparatus for recording media of a system for recording, storing and reproducing information which is generally referred to as a random access library system.

Heretofore, an article storage apparatus has been known which includes article storage means having a plurality of cells adapted to have articles selectively placed therein and taken out therefrom. For example, there is known a storage apparatus for recording media of a system for recording, storing and reproducing information which includes article storage means in the form of an article storage wall formed therein with a plurality of cells each for storing therein a cartridge which is an article, a main carriage movable in a horizontal direction, an elevator carried on the main carriage vertically movably along the article storage means, and electromagnetic access means mounted in the elevator for placing an article in each cell and taking out the same therefrom. This type of storage apparatus has the disadvantage that a mechanism for selectively placing a specific article in one of the cells and taking out the same therefrom is complex in construction and thus adversely affects the reliability in operation of the apparatus. Besides, this complex mechanism makes the apparatus large in size.

SUMMARY OF THE INVENTION

It is therefore an object of the present invention to provide an article storage apparatus which does not include article selecting mechanism of complex construction and thereby achieves a compact structure of the apparatus, high reliability in operation and reduced access time.

It is another object of the invention to provide an article storage apparatus of simple construction which utilizes the weight of an article itself upon placing the article in the storage means and taking out the same therefrom.

According to the present invention, there is provided an article storage apparatus which comprises article storage means including along the circumference thereof a plurality of inclined cells for storing articles therein, a disk-like shield plate formed with an opening therein, and driving-positioning means operable to rotate the storage means and the shield plate to bring one of the cells storing therein a desirable article to an uppermost position and to bring the opening in the shield plate to a position substantially aligned with the one cell when the desirable article is to be taken out, the driving-positioning means being operable also to rotate the storage means and the shield plate to bring one of the cells to a lowermost position and to bring the opening in the shield plate to a position substantially aligned with the latter one cell when an article is to be received in the latter one cell, whereby the desirable article can be taken out from the cell in the uppermost position and the article to be received can be stored in the one cell in the lowermost position.

The foregoing and other objects as well as the characteristic features of the invention will become more apparent from the following description when read in conjunction with the accompanying drawings.

DETAILED DESCRIPTION OF THE PREFERRED EMBODIMENT

Figure 1:
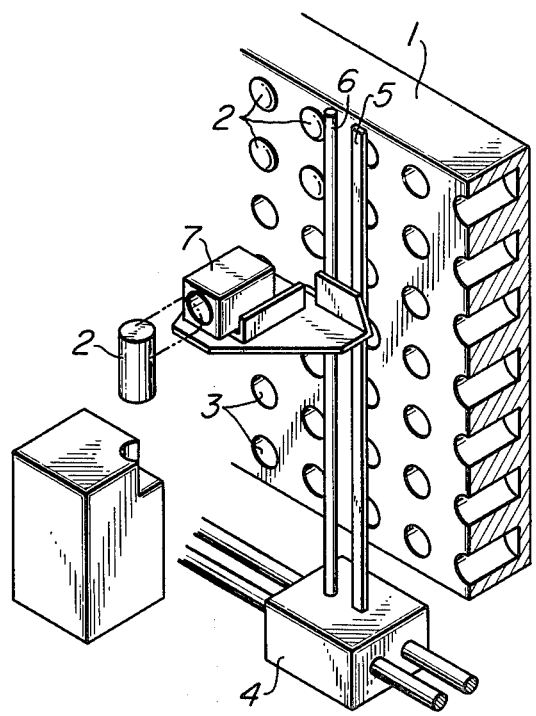
FIG. 1 is a schematic perspective view of an article storage apparatus of the prior art which is adapted for storing recording media of a system for recording, storing and reproducing information.

Before entering into detailed discussion of the preferred embodiment of the present invention, an article storage apparatus of the prior art will be described by referring to FIG. 1. In FIG. 1, there is shown a conventional article storage apparatus adapted for storing recording media of a system for recording, storing and reproducing information, which includes article storage means 1 in the form of a storage wall. The storage means 1 is formed therein with a plurality of cells 3 arranged in vertical columns and horizontal rows and opened to one surface of the storage wall for storing therein cartridges 2 which are articles in this example. A main carriage 4 which is movable in a horizontal direction has attached thereto a vertical guide post 5 and a vertical elevator post 6. An elevator 7 is vertically movable along these two posts 5 and 6. The elevator 7 has mounted thereon electromagnetic access means for placing the cartridge 2 in one of the cells 3 and taking out the same therefrom.

The article storage apparatus of the prior art constructed as aforesaid is provided with mechanism of complex construction for selecting the desired article or cartridge 2. Thus, the apparatus has the disadvantages that it is unreliable in operation and is large in overall size.

Figure 2:
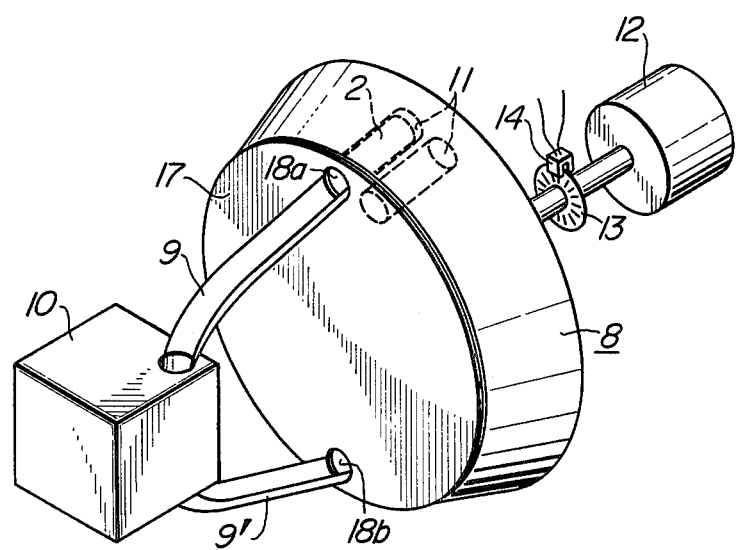
FIG. 2 is a perspective view of an article storage apparatus according to an embodiment of the invention.

FIGS. 2 and 3 show an article storage apparatus according to a preferred embodiment of the invention. Referring to FIG. 2, article storage means 8 which has generally a frusto-conical shape is formed along the circumference thereof with a plurality of cells 11 for storing the cartridges 2 therein, one cartridge 2 in each cell 11. Each cell 11 has a longitudinal axis inclined toward the left as viewed in FIG. 2 with respect to the horizontal. The article storage means 8 is adapted for rotation and can stop in any angular position as desired. The article storage means 8 is rotated by drive means 12 and can be positioned in any position after rotation by an encoder 13 and a decoder 14 in the form of code disks which are coaxial with the drive means 12. The article storage means 8 has a fixed or stationary disk 17 mounted on that side of the storage means 8 near to a recording and reproducing apparatus 10. The fixed disk 17 is formed with openings 18a and 18b located in upper and lower positions, respectively, diametrically opposed to each other.

Figure 3A:
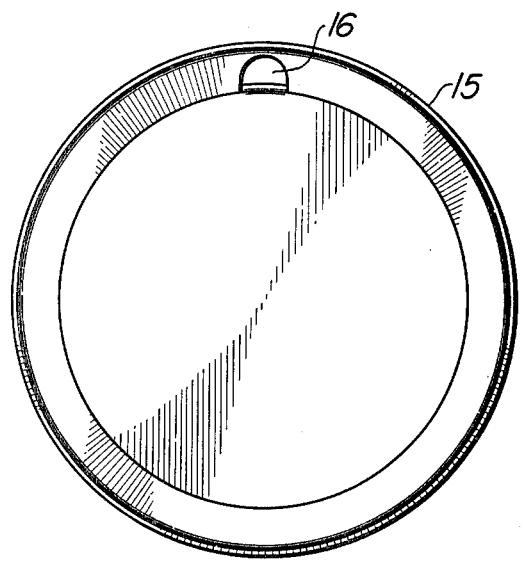
FIG. 3a is a front view of a shield plate of the apparatus shown in FIG. 2.
Figure 3B:
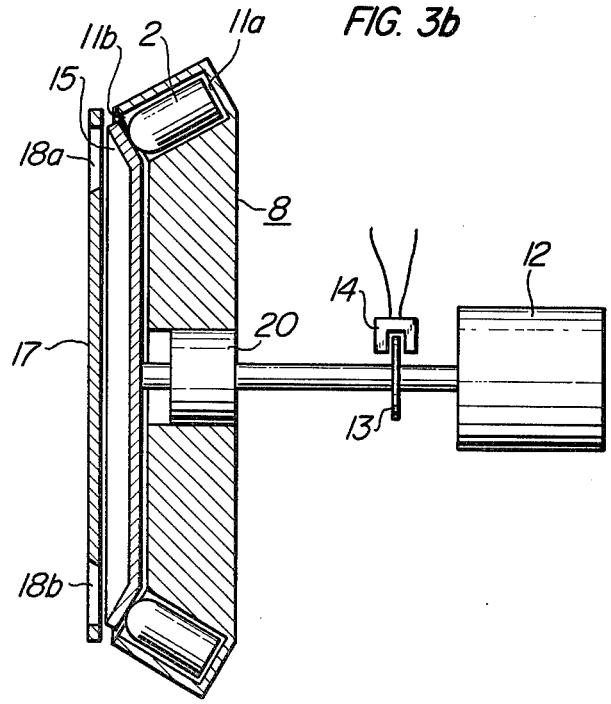
FIG. 3b is a sectional view of the article storage apparatus shown in FIG. 2.

A shield plate 15 as best shown in FIG. 3b is interposed between the fixed disk 17 and the front side (or left side as viewed in FIG. 3b) of the article storage means 8. Normally, the shield plate 15 is rotated together with the article storage means 8 in one direction or counterclockwise, for example, by the drive means 12. The amount or angle of rotation is controlled by the encoder 13 and the decoder 14 so that the cell 11a storing the desired cartridge 2 may stop in an uppermost position or in a position substantially aligned with the upper opening 18a formed in the fixed disk 17 when the desired cartridge 2 is to be taken out.

At this time, the shield plate 15 is arranged such that an opening 11b of the cell 11a of the article storage means 8 which stores the desired cartridge 2 is closed by the shield plate 15. Thus, an opening 16 in the shield plate 15, shown in FIG. 3a, is positioned between the opening 11b of the cell 11a and an opening of an adjacent cell 11.

When the cell 11a storing therein the cartridge 2 of interest is disposed in the uppermost position, the drive means 12 reverses its direction of drive or rotates in a clockwise direction, for example, so that the shield plate 15 is driven to rotate in a direction opposite to the direction of rotation of the article storage means 8 by the drive means 12.

At this time, the article storage means 8 is stationary. In order to successfully perform these operations of the article storage means 8 and the shield plate 15, the article storage means 8 and the drive means 12 are connected to each other through a one-way clutch 20 which is located in the central bore of the article storage means 8 and arranged on a forward or left end portion of a shaft of the drive means 12. The one-way clutch 20 is in a coupling state when the article storage means 8 and the shield plate 15 are rotated in the counterclockwise direction. Thus, the article storage means 8 and shield plate 15 can be rotated simultaneously. However, when the drive means 12 reverses its direction of rotation and rotates in the clockwise direction, the article storage means 8 remains stationary by its own weight while the shield plate 15 directly connected to the shaft of the drive means 12 rotates in the clockwise direction.

Rotation of the shield plate 15 is controlled such that the clockwise rotation of the shield plate 15 brings the opening 16 in the plate 15 to the uppermost position. Positioning of the opening 16 as well as the positioning of the article storage means 8 is controlled by the encoder 13 and decoder 14. Thus, the encoder 13, decoder 14 and drive means 12 constitute driving-positioning means.

When the opening 16 in the shield plate 15 as indexed and substantially aligned with the opening 11b of the cell 11a in the article storage means 8 which stores the desired cartridge 2, the cartridge 2 moves by its own weight, through the opening 11b of the cell 11a, the opening 16 in the shield plate 15 and the upper opening 18a in the fixed disk 17, into an input guide 9 through which the cartridge 2 is transferred to the recording and reproducing apparatus 10.

Upon completion of processing of the cartridge 2 in the recording and reproducing apparatus 10, the shield plate 15 and article storage means 8 are simultaneously rotated in the counterclockwise direction through the action of the one-way clutch 20 and stop rotating when the opening 16 in the shield plate 15 and the cell 11a in the article storage means 8 are brought to a cartridge receiving position in which they are indexed to a position substantially aligned with an exit guide 9'. The rotation of the shield plate 15 and article storage means 8 is controlled by the encoder 13 and decoder 14.

At the time when the shield plate 15 and article storage means 8 are positioned in the cartridge receiving position, the cartridge 2 which has been subjected to recording or reproduction is ejected from the apparatus 10 and moves by its own weight through the exit guide 9' to the cell 11a to be stored therein.

It is to be noted here that the apparatus 10 is equipped with a reversing mechanism (not shown) which is operable to reverse the orientation of the cartridge. After the cartridge has been processed in the apparatus 10, the orientation of the cartridge is reversed by the reversing mechanism. Thus, the processed cartridge can be stored in the cell in the same condition as having been stored in the cell prior to processing.

The apparatus according to the invention operates as aforesaid. Next, the control by the encoder 13 and decoder 14 will be discussed briefly. The encoder 13 is formed with apertures corresponding to the cells 11 storing the cartridges 2 therein and permitting light to pass therethrough, and with two openings, spaced by a small distance, for indicating a rotation reference position. By using as a reference the position in which pulses of a small interval corresponding to these two openings are produced, control is effected in such a manner that the position of a cartridge 2 to which access should be made is counted or the shield plate 15 is moved to a position in which its opening 16 is brought to the uppermost position.

From the foregoing description, it will be appreciated that the articles stored in the cells are taken out therefrom or the articles are placed in the cells by the weight of the article itself. Thus, the storage apparatus according to the invention enables any desired articles to be taken out from and stored in the cells without using selecting mechanism of complex construction. The invention offers advantages in that the size of the article storage apparatus can be reduced, and that the apparatus is high in reliability in performance and has a shortened access time.

What is claimed is:

1. An article storage apparatus comprising:
article storage means including along the circumference thereof a plurality of inclined cells for storing articles therein,
a disk-like shield plate formed with an opening therein, and
driving-positioning means operable to rotate said storage means and said shield plate to bring one of said cells storing therein a desirable article to an uppermost position and to bring said opening in said shield plate to a position substantially aligned with said one cell when said desirable article is to be taken out,
said driving-positioning means being operable also to rotate said storage means and said shield plate to bring one of said cells to a lowermost position and to bring said opening in said shield plate to a position substantially aligned with the latter one cell when an article is to be received in the latter one cell, whereby said desirable article can be taken out from said cell in the uppermost position and said article to be received can be stored in said one cell in the lowermost position.

2. An article storage apparatus as set forth in claim 1, further comprising a one-way clutch which connects said article storage means with said driving-positioning means.

3. An article storage apparatus comprising:
article storage maans including along the circumference thereof a plurality of inclined cells for storing articles therein, a stationary disk formed therein with upper and lower openings, a shield plate interposed between said storage means and said stationary disk and formed therein with an opening, and driving-positioning means operable to rotate said storage means and said shield plate to bring one of said cells storing therein a desirable article to a position substantially aligned with said upper opening of said statonary disk and to bring said opening formed in said shield plate to a position substantially aligned with said upper opening when said desirable article is to be taken out, said driving-positioning means being operable also to rotate said storage means and said shield plate to bring one of said cells to a position substantially aligned with said lower opening in said stationary disk and to bring said opening formed in said shield plate to a position substantially aligned with said lower opening when an article is to be received in the latter one cell, whereby said desirable article can be taken out from said cell substantially aligned with said upper opening and said article to be received can be stored in said cell substantially aligned with said lower opening.

* * * * *